United States Patent
Yamamura (10) Patent No.: US 8,539,852 B2
(45) Date of Patent: Sep. 24, 2013

(54) GEARSHIFT LEVER FOR VEHICLE TRANSMISSION

(75) Inventor: Norihiro Yamamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 92 days.

(21) Appl. No.: 13/101,768

(22) Filed: May 5, 2011

(65) Prior Publication Data

US 2011/0308346 A1     Dec. 22, 2011

(30) Foreign Application Priority Data

Jun. 17, 2010   (JP) .................................. 2010-138296

(51) Int. Cl.
*B60K 20/00*     (2006.01)

(52) U.S. Cl.
USPC .......................... 74/473.35; 74/473.3; 74/543

(58) Field of Classification Search
USPC ................... 74/473.3, 473.1, 473.32, 473.25, 74/473.26, 473.35, 533, 543
See application file for complete search history.

(56) References Cited

U.S. PATENT DOCUMENTS

| | | | | |
|---|---|---|---|---|
| 4,774,850 A | * | 10/1988 | Shovlin | 74/473.23 |
| 5,033,324 A | * | 7/1991 | Glaser | 74/473.19 |
| 5,410,931 A | * | 5/1995 | Pecceu | 74/473.33 |
| 5,458,017 A | * | 10/1995 | Kanematsu et al. | 74/473.23 |
| 5,575,174 A | * | 11/1996 | Kanematsu et al. | 74/473.23 |
| 5,617,760 A | * | 4/1997 | Woeste et al. | 74/473.23 |
| 6,105,452 A | * | 8/2000 | Bravo | 74/473.18 |
| 6,435,052 B1 | * | 8/2002 | Ersoy et al. | 74/473.1 |
| 6,601,469 B1 | * | 8/2003 | Giefer et al. | 74/537 |
| 6,732,608 B2 | * | 5/2004 | Suzuki | 74/473.3 |
| 7,000,497 B1 | * | 2/2006 | Campbell et al. | 74/525 |
| 7,272,988 B2 | * | 9/2007 | Meyer et al. | 74/473.3 |
| 8,312,787 B2 | * | 11/2012 | Na et al. | 74/473.3 |

FOREIGN PATENT DOCUMENTS

| | | |
|---|---|---|
| JP | S55-39477 | 9/1980 |
| JP | 56-156113 U | 11/1981 |
| JP | S58-171528 | 11/1983 |
| JP | 6-43412 | 6/1994 |
| JP | 07-259973 | 10/1995 |
| JP | 3600631 B2 | 9/2004 |
| JP | 2006-51862 A | 2/2006 |

OTHER PUBLICATIONS

Chinese Office Action Dated Jul. 3, 2013, Cited in CN 2011101117644, 7 Pgs.
Japanese Office Action Dated Jun. 25, 2013, Cited in JP 2010-138296, 2 Pgs.

* cited by examiner

*Primary Examiner* — David M Fenstermacher
(74) *Attorney, Agent, or Firm* — Patterson Thuente Pedersen, P.A.

(57) ABSTRACT

A gearshift lever for switching a gear range of a vehicle transmission includes a lever body, which accommodates a detent rod, and an operation unit, which is arranged on the lever body. The operation unit is pushed to disengage the detent rod from a detent receptacle formed in a base plate and cancel pivoting restriction of the lever body. The operation unit includes an inclined surface on which the detent rod slides. The inclined surface moves the detent rod in a direction in which the detent rod disengages from the detent receptacle when the operation unit is pushed. The operation unit also includes a coil spring, which biases the operation unit in a direction that is the same as a direction in which the operation unit is pushed to hold the detent rod in contact with the inclined surface, and a mount, which positions the coil spring.

10 Claims, 11 Drawing Sheets

Biasing Force Of Coil Spring 5

GEARSHIFT LEVER FOR VEHICLE TRANSMISSION

CROSS-REFERENCE TO RELATED APPLICATIONS

This application is based upon and claims the benefit of priority from prior Japanese Patent Application No. 2010-138296, filed on Jun. 17, 2010, the entire contents of which are incorporated herein by reference.

BACKGROUND OF THE INVENTION

The present invention relates to a gearshift lever that is operated to switch a gear range of a transmission installed in a vehicle or the like.

Figure 1A:
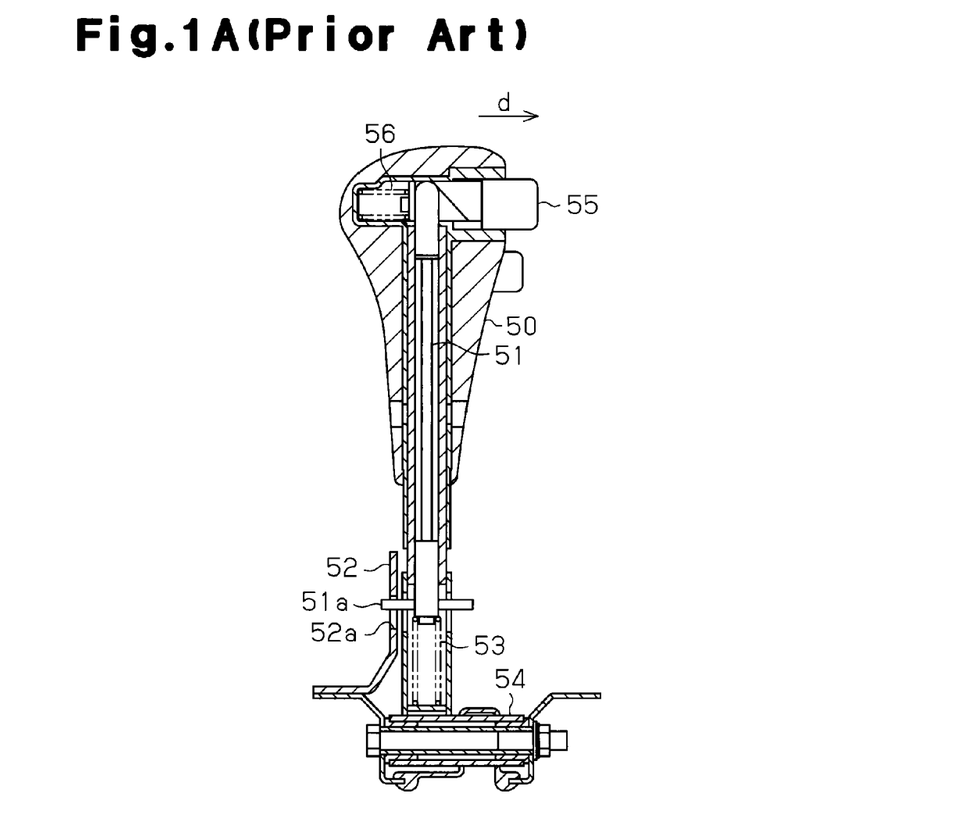
FIG. 1A is a cross-sectional view showing the structure of a gearshift lever in the prior art.
Figure 1B:
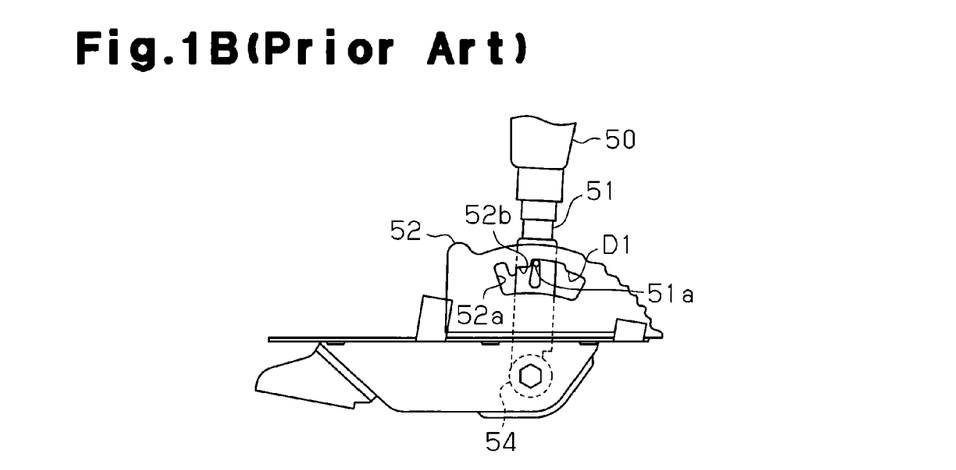
FIG. 1B is a side view showing a guide groove engaged with a detent pin in the gearshift lever of FIG. 1A.

As known in the art, when a transmission in installed in a vehicle, a gearshift lever is used to switch the gear range of the transmission. The gearshift lever typically includes a detent mechanism to restrict unnecessary movement of the gearshift lever to a reverse range, in which the driving wheels of the vehicle are driven in reverse direction, or to a parking range, in which the driving wheels are locked. Japanese Patent Publication No. 3600631 describes a conventional gearshift lever including such a detent mechanism. FIGS. 1A and 1B schematically show the gearshift lever described in the publication.

As shown in FIGS. 1A and 1B, the detent mechanism basically includes a detent rod 51, which is inserted into a lever body 50, and a base plate 52, which has a detent receptacle 52a. The detent rod 51 has a basal portion on which a detent pin 51a is formed. The detent pin 51a is inserted into the detent receptacle 52a. The detent receptacle 52a has an upper inner wall surface in which a guide groove 52b is formed. The guide groove 52b includes a plurality of steps of different heights corresponding to different gear ranges. A coil spring 53 biases the basal portion of the detent rod 51 to hold the detent pin 51a in a state engaged with the guide groove 52b. The engagement of the detent pin 51a with the guide groove 52b results in the steps of the guide groove 52b restricting pivoting of the lever body 50 about a pivot shaft 54 of the lever body 50. The lever body 50 includes a distal portion on which an operation unit 55 is arranged. A user pushes and operates the operation unit 55. A coil spring 56 biases the operation unit 55 in a direction opposite to the direction in which the operation unit 55 is pushed (direction indicated by arrow d in FIG. 1A).

In this gearshift lever, when the user pushes the operation unit 55, a basal portion of the operation unit 55 pushes the detent pin 51a. This lowers the detent pin 51a against the biasing force of the coil spring 53. As a result, the detent pin 51a is disengaged from the guide groove 52b to release the lever body 50.

When the detent pin 51a is shifted, for example, from a position at which it engages the step of the guide groove 52b as shown in FIG. 1B is shifted to a position at which it engages a step D1, the detent rod 51 is moved downward from the position shown in FIG. 1B. The movement of the detent rod 51 forms a gap between the distal portion of the detent rod 51 and the operation unit 55. When such a gap is formed, the user may push the operation unit 55. In such a case, the user first counters just the biasing force of the coil spring 56. Thus, the user will first find the operation unit 55 as being relatively light until the operation unit 55 comes into contact with the detent rod 51. Then, when the operation unit 55 comes into contact with the detent rod 51, the user will counter the biasing force of the coil spring 53 in addition to the biasing force of the coil spring 56. Thus, the user will first find the operation unit 55 as being relatively heavy. Since the responsiveness of the operation unit 55 changes, the user may feel uncomfortable.

Figure 2:
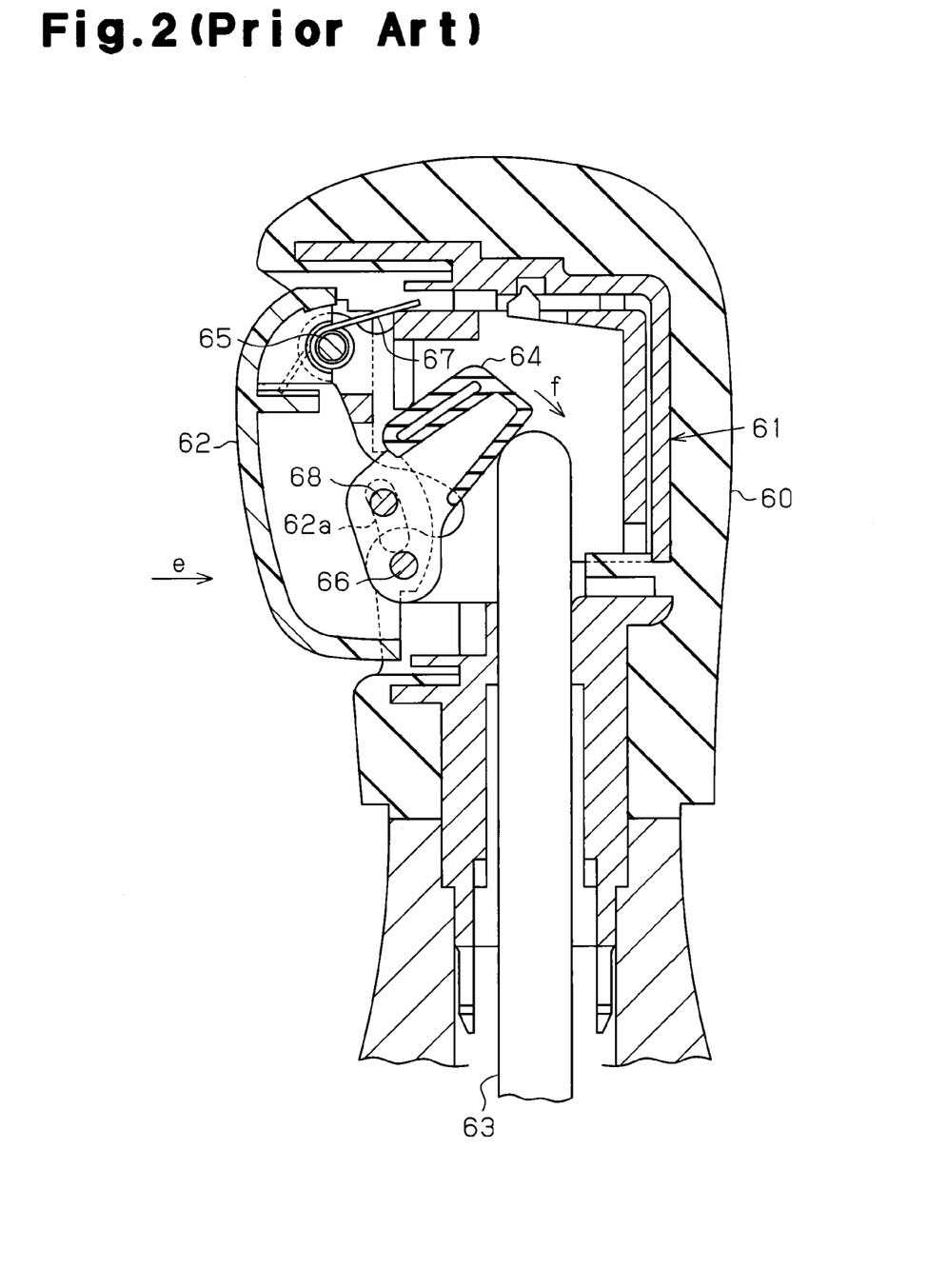
FIG. 2 is a cross-sectional view showing the structure of another gearshift lever in the prior art.

In the prior art, Japanese Laid-Open Patent Publication No. 2006-51862 discusses a method for biasing the operation unit in the same direction as the direction in which it is pushed. FIG. 2 shows the cross-sectional structure of a gearshift lever described in the publication.

As shown in FIG. 2, the gearshift lever mainly includes a holder 61, which is fitted into a lever body 60, an operation unit 62, which is pivotally supported by a first shaft 65 in the holder 61, and a link member 64, which is pivotally supported by a second shaft 66 in the holder 61. A torsion coil spring 67 is arranged on the first shaft 65 to bias the operation unit 62 in the direction in which the operation unit 62 is pushed (the direction indicated by arrow e in the drawing). The operation unit 62 includes an arc-shaped elongated hole 62a. A third shaft 68 of the link member 64 is inserted into the elongated hole 62a.

In this gearshift lever, when the operation unit 62 is pushed in the direction indicated by arrow e, the operation unit 62 pivots about the first shaft 65 and pushes the third shaft 68 in the direction indicated by arrow e. This moves the third shaft 68 in the elongated hole 62a, while pivoting the link member 64 in a direction indicated by arrow f and pushing a distal portion of a detent rod 63. As a result, the detent rod 63 is pushed downward. In the gearshift lever, the torsion coil spring 67 biases the operation unit 62 in the direction indicated by arrow e. This constantly biases the link member 64 in the direction indicated by arrow f. Thus, even when the detent rod 63 is moved downward from the position shown in the drawing, the link member 64 and the detent rod 63 remain in contact with each other. Accordingly, when the user pushes the operation unit 62, the user is constantly required to apply a force countering the resultant force of the biasing force of the torsion coil spring 67 and a force biasing the detent rod 63 upward. As a result, the responsiveness of the operation unit 62 does not significantly change, and the user does not feel uncomfortable.

In this manner, by biasing an operation unit in the same direction as the direction in which it is pushed, the user feels no discomfort when pushing the operation unit. However, such a gearshift lever needs the link member. This increases the number of components and complicates the structure of the overall gearshift lever. Thus, there is still room for improvement from the viewpoint of practical application.

SUMMARY OF THE INVENTION

It is an object of the present invention to provide a gearshift lever that has a simple structure, while preventing a user from feeling uncomfortable when operating an operation unit.

One aspect of the present invention is a gearshift lever for changing a gear range of a vehicle transmission. The gearshift lever is pivotally supported by a base plate. The gearshift lever includes a lever body and a detent rod, which is accommodated in the lever body. The detent rod engages a detent receptacle arranged in the base plate to restrict pivoting of the lever body. An operation unit is arranged on the lever body. The operation unit is pushed and operated to disengage the detent rod from the detent receptacle and cancel the pivoting restriction of the lever body. The operation unit includes an inclined surface, on which the detent rod slides. The inclined surface moves the detent rod in a direction in which the detent rod disengages from the detent receptacle when the operation unit is pushed. A coil spring biases the operation unit in a direction, which is the same as a direction in which the operation unit is pushed, to hold the detent rod in contact with the inclined surface. A mount positions the coil spring. The mount is configured to be mounted to the lever body in a state in which the coil spring is positioned in the mount.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A gearshift lever according to a first embodiment of the present invention will now be discussed with reference to FIGS. 3 to 12. An overview for the gearshift lever of the present embodiment will first be given with reference to FIG. 3.

Figure 3:
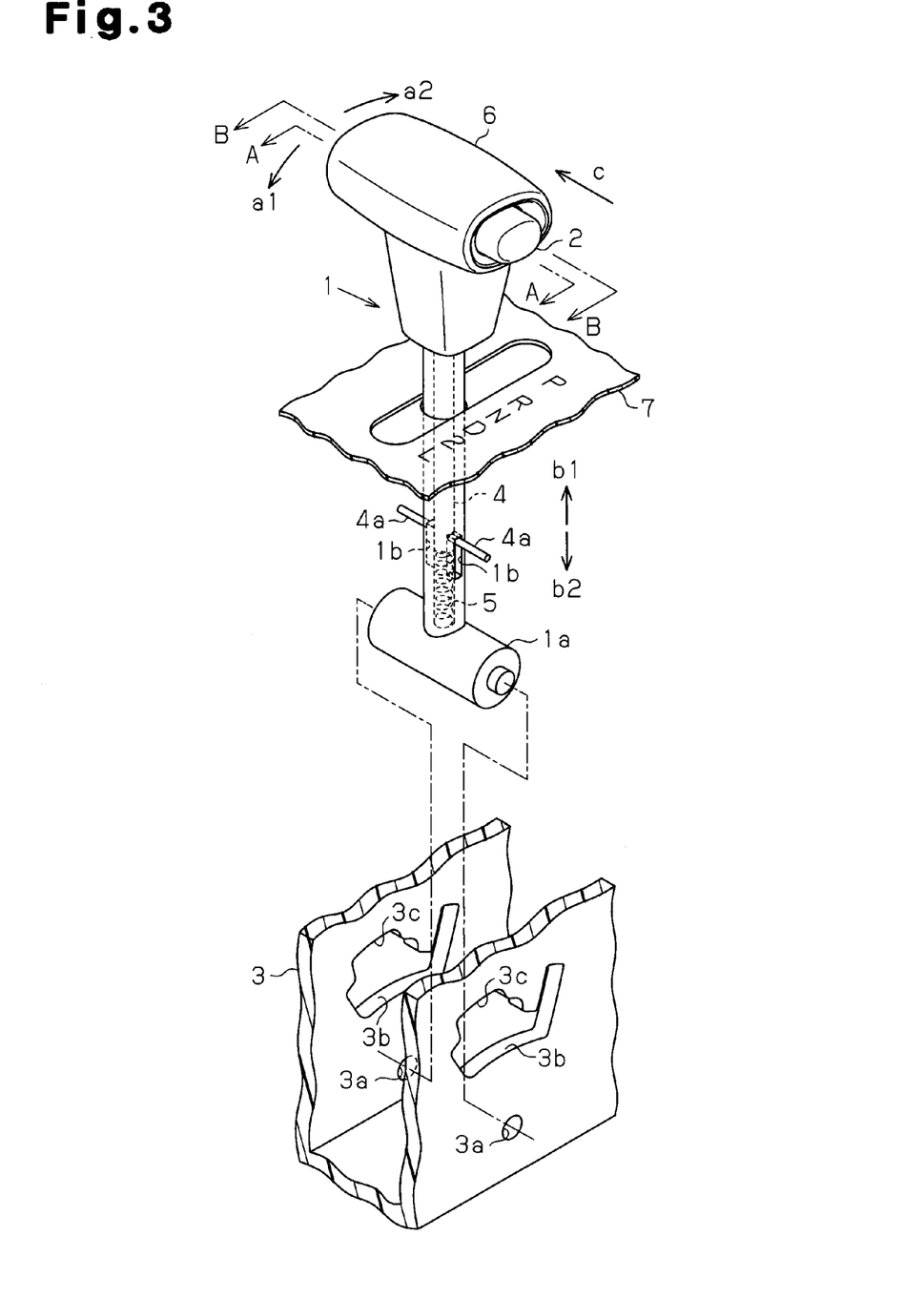
FIG. 3 is an exploded perspective view schematically showing a gearshift lever according to a first embodiment of the present invention.

As shown in FIG. 3, the structure of this gearshift lever is basically the same as the structure of the gearshift lever shown in FIG. 1A. The gearshift lever of the present embodiment includes a detent mechanism mainly formed by a lever body 1, which is operated to switch the gear range of a transmission installed in a vehicle, and a base plate 3, which is fixed to the vehicle. The lever body 1 has a basal portion formed by a shaft 1a. The shaft 1a has two ends fitted engaged with shaft holes 3a of the base plate 3. This pivotally supports the lever body 1 in directions indicated by arrows a1 and a2. The lever body 1 includes a tube accommodating a detent rod 4 and a coil spring 5. The coil spring 5 biases the detent rod 4 upward. The detent rod 4 has a basal portion in which a detent pin 4a is arranged. The detent pin 4a projects out of the lever body 1 through slits 1b formed in the wall of the lever body 1. The detent pin 4a is inserted through detent receptacles 3b formed in the base plate 3. Each detent receptacle 3b has an upper inner wall surface in which a guide groove 3c is formed. The guide groove 3c includes a plurality of steps of different heights corresponding to different gear ranges. The engagement of the detent pin 4a with the guide grooves 3c results in the steps of the guide grooves 3c restricting pivoting of the lever body 1. The detent rod 4 is moved in its longitudinal direction (directions indicated by arrows b1 and b2 in FIG. 3) in accordance with the positions at which the detent pin 4a engages the steps of the guide grooves 3c.

The lever body 1 has a distal portion on which a T-shaped grip 6 held by a user is arranged. The grip 6 is formed from an elastic material, such as rubber. The grip 6 has one end in which an operation unit 2 is arranged. The operation unit 2 is operable, or pushed by the user, in a direction indicated by arrow c. When the operation unit 2 of the gearshift lever is pushed, the detent rod 4 is pushed downward in the direction indicated by arrow b2 against the biasing force of the coil spring 5. At the same time, the detent pin 4a is moved along the slits 1b in the direction indicated by arrow b2 and disengaged from the guide groove 3c. This releases the lever body 1 and enables the lever body 1 to be pivoted and moved to gearshift positions, which are marked on a shift panel 7. In other words, the gear range of the transmission is switched.

The structure of the lever body 1 and the operation unit 2 will now be described with reference to FIG. 4. To facilitate understanding, the lever body 1 and the grip 6 shown in FIG. 4 are partly cut away.

Figure 4:
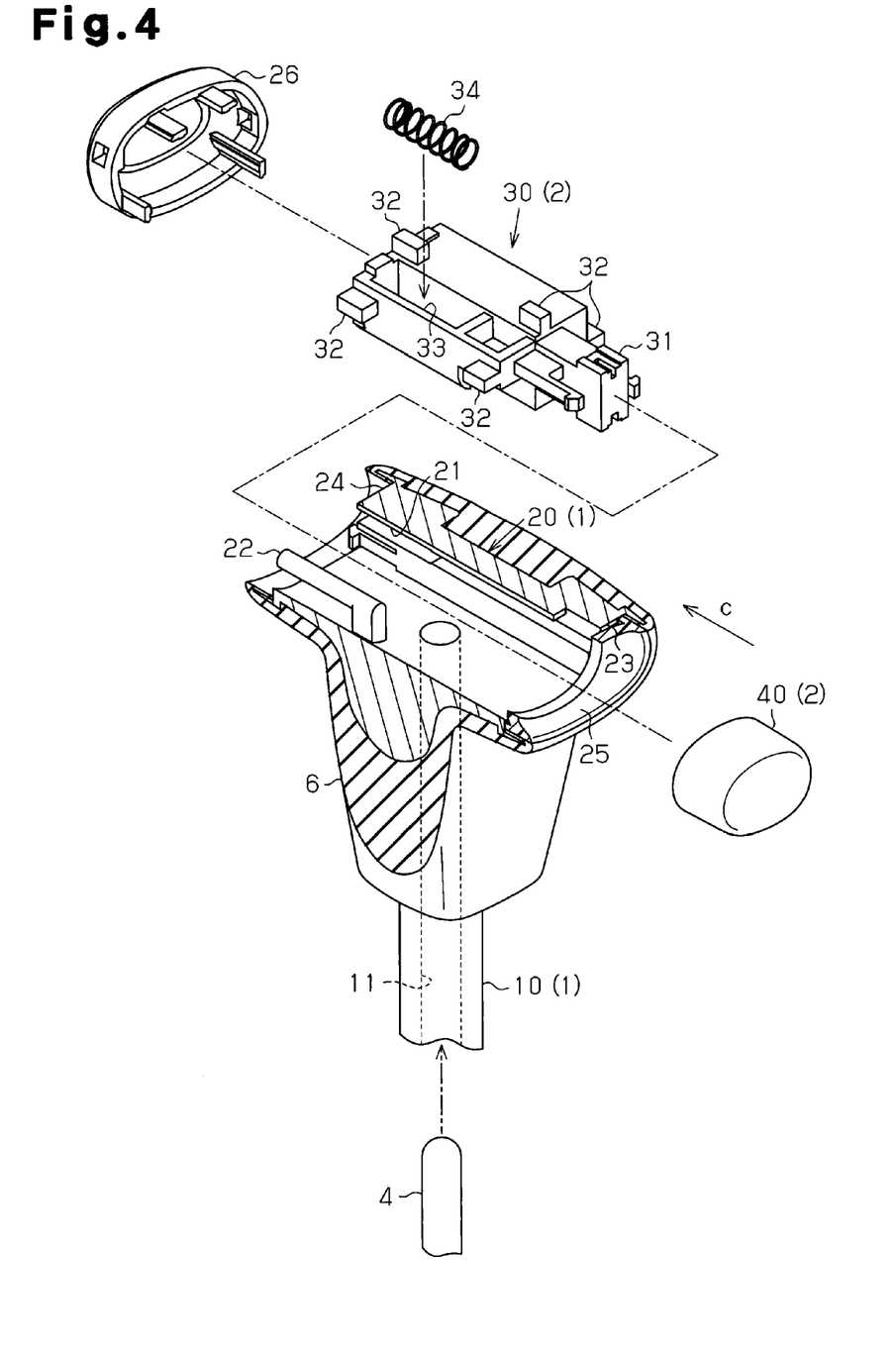
FIG. 4 is an exploded perspective view schematically showing a lever body and an operation unit in the gearshift lever of FIG. 3.

As shown in FIG. 4, the lever body 1 basically includes a tubular bar 10, into which the detent rod 4 is inserted, and a tubular handle 20, which accommodates the operation unit 2. The bar 10 includes a bore 11, into which the detent rod 4 is inserted. The bore 11 extends through the bar 10 and into the handle 20. When the detent rod 4 is fitted into the bore 11, a distal portion of the detent rod 4 projects into the handle 20. The handle 20 has an inner upper wall surface and two inner side wall surfaces, each including a groove 21 that extends in a direction indicated by arrow c (only one groove 21 is shown in FIG. 4). An L-shaped extension 22 is arranged on an inner lower wall surface of the handle 20. The extension 22 includes a first portion extending upright from the lower wall surface of the handle 20 and a second portion extending from the first portion in the direction indicated by arrow c. The handle 20 includes two open ends 23 and 24. A panel 25 is fitted into the open end 23, and a panel 26 is fitted into the other open end 24.

The operation unit 2 includes two separate components, namely, a button 40 and a holder 30. The button 40 is pushed and operated by the user. The holder 30 is accommodated in the handle 20. The holder 30 includes a fastener 31, which is formed on one end (right end in FIG. 4) of the holder 30. The fastener 31 integrally couples the button 40 to the holder 30.

Projections 32 are formed on front, rear, and upper surfaces of the holder 30. The projections 32 engage the grooves 21 in the handle 20. This guides movement of the holder 30 in the direction indicated by arrow c. A box-shaped mount 33, which has an open upper surface, is defined in a front side of the holder 30. A coil spring 34 is inserted into the mount 33 from the opening and accommodated in the mount 33.

Figure 5:
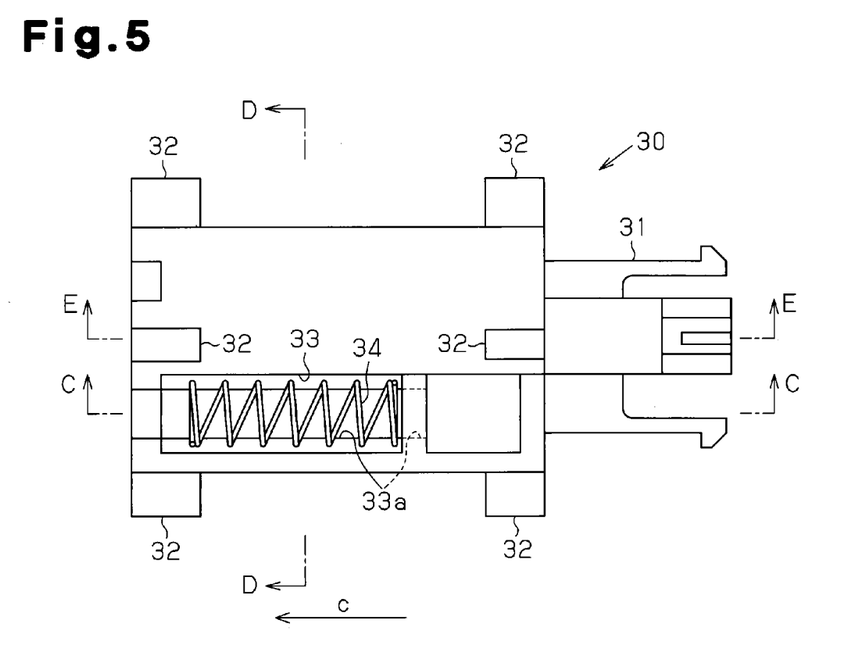
FIG. 5 is a plan view schematically showing a holder in the gearshift lever of FIG. 4.
Figure 6:
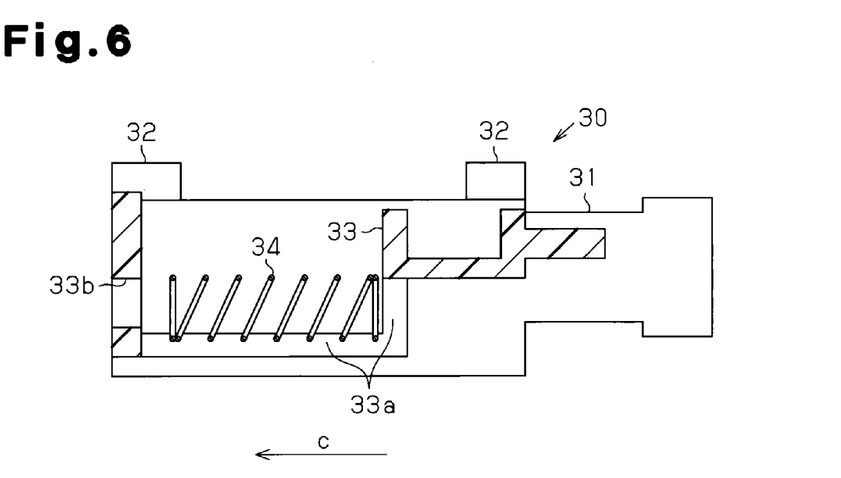
FIG. 6 is a cross-sectional view taken along line C-C in FIG. 5.
Figure 7:
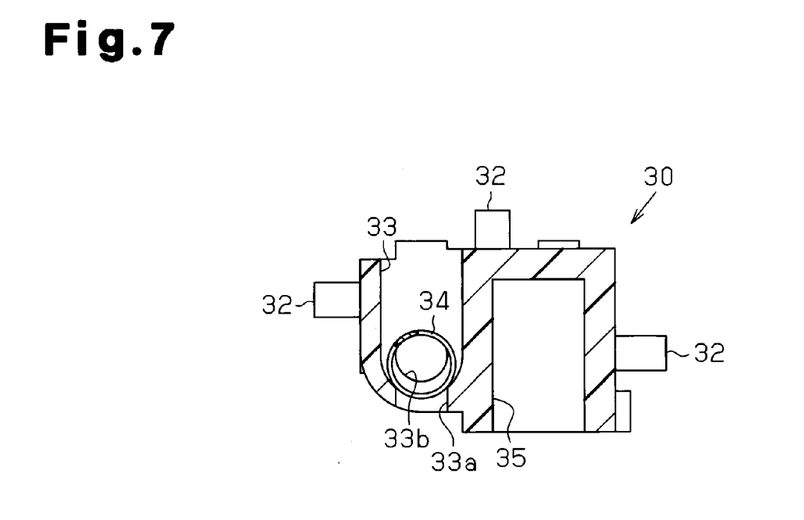
FIG. 7 is a cross-sectional view taken along line D-D in FIG. 5.
Figure 8:
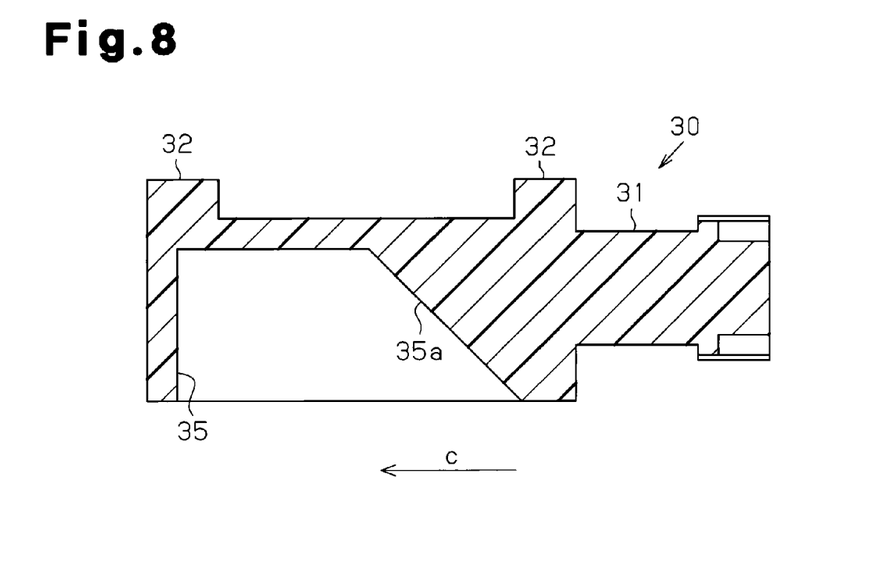
FIG. 8 is a cross-sectional view taken along line E-E in FIG. 5.

The structure of the holder 30 including the mount 33 will now be described in detail with reference to FIGS. 5 to 8. FIG. 5 is a plan view of the holder 30. FIGS. 6 to 8 are cross-sectional views of the holder 30 shown in FIG. 5 taken along line C-C, line D-D, and line E-E, respectively.

As shown in FIGS. 5 and 6, a slit 33a is formed in a right wall and a bottom wall of the mount 33. The slit 33a extends in the direction indicated by arrow c and from an inner side to an outer side of the mount 33. A through hole 33b extends through a left wall of the mount 33. As shown in FIG. 7, in the holder 30, the coil spring 34 is set on the bottom surface of the mount 33 to accommodate the coil spring 34 in the mount 33. As shown in FIG. 8, the holder 30 includes a recess 35 adjacent to the mount 33. The recess 35 opens downward. The recess 35 has an inner wall surface located near the fastener 31 that is an inclined surface 35a. The inclined surface 35a is inclined at an acute angle with respect to the direction indicated by arrow c.

The coil spring 34 can be mounted onto the holder 30 just by inserting the coil spring 34 through the upper opening of the mount 33. This facilitates the mounting of the coil spring 34 and improves convenience when assembling the gearshift lever.

Figure 9A:
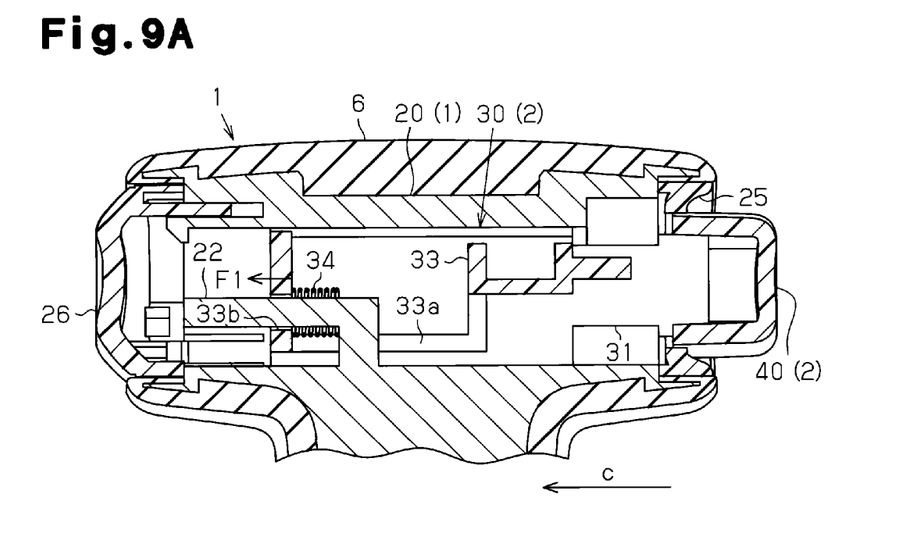
FIG. 9A is a cross-sectional view taken along line A-A in FIG. 3.
Figure 9B:
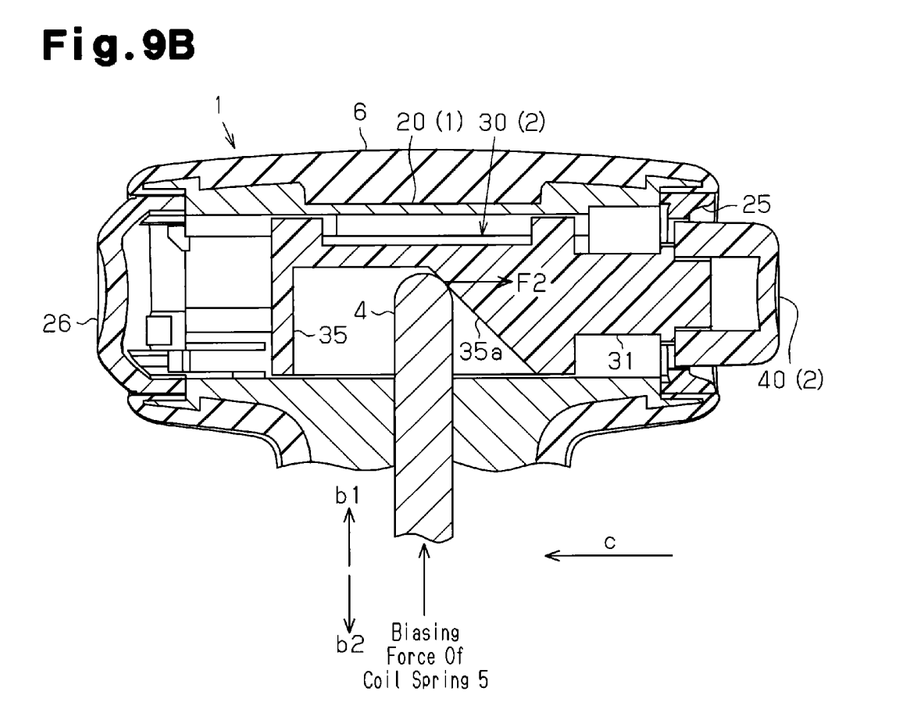
FIG. 9B is a cross-sectional view taken along line B-B in FIG. 3.
Figure 10A:
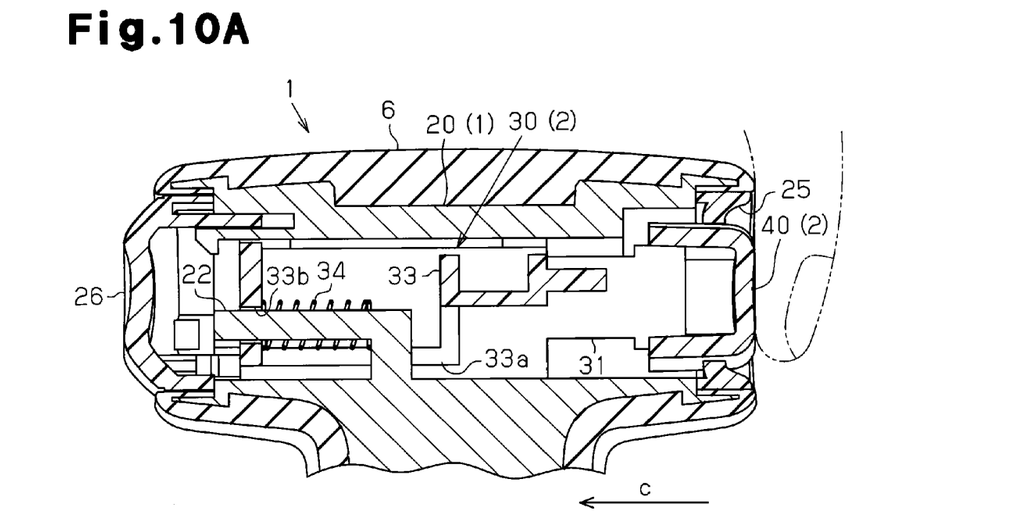
FIG. 10A is a cross-sectional view showing an example of the operation of the gearshift lever in FIG. 3.
Figure 10B:
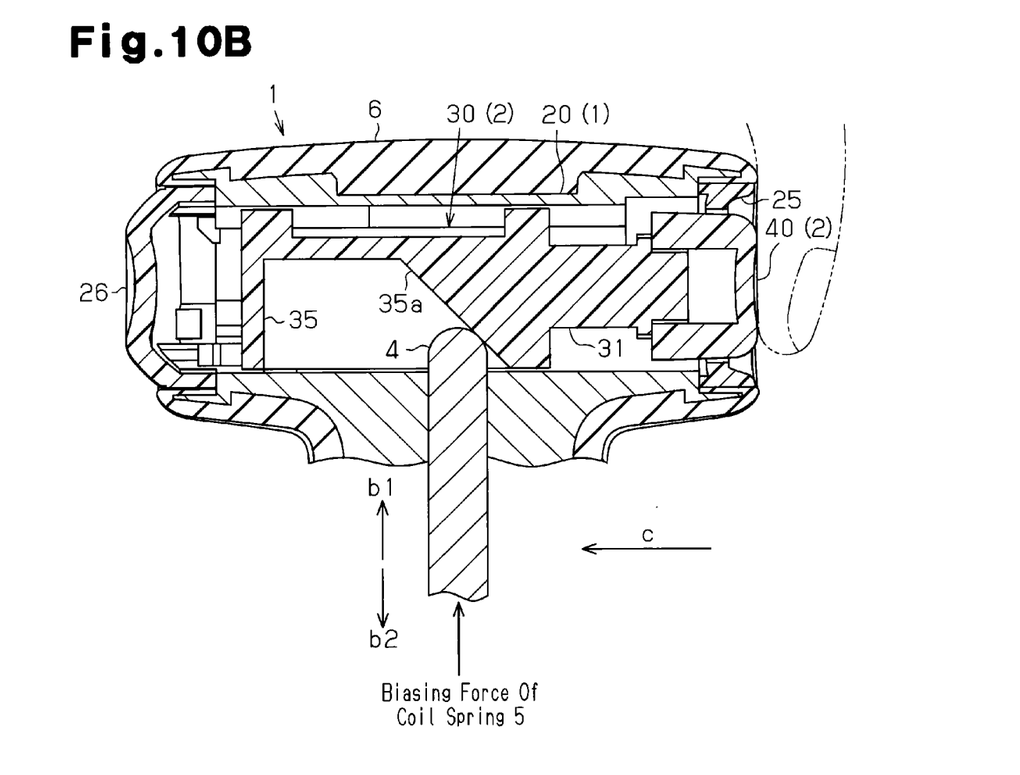
FIG. 10B is a cross-sectional view showing an example of the operation of the gearshift lever in FIG. 3.

The structure and operation of the gearshift lever of the first embodiment will now be discussed with reference to FIGS. 9A and 9B and FIGS. 10A and 10B. FIGS. 9A and 10A are cross-sectional views taken along line A-A in FIGS. 3, and FIGS. 9B and 10B are cross-sectional views taken along line B-B in FIG. 3.

As shown in FIG. 9A, the extension 22 of the handle 20 is inserted into the mount 33 of the holder 30 through the slit 33a. The extension 22 has a distal portion inserted through the through hole 33b of the holder 30. Further, the coil spring 34 is set on the part of the extension 22 that extends in the direction indicated by arrow c. This prevents displacement of the coil spring 34. The coil spring 34 is held and compressed between the side wall of the mount 33 and the extension 22. This biases the holder 30 in the direction indicated by arrow c with a biasing force F1. As shown in FIG. 9B, the distal portion of the detent rod 4 is in contact with the inclined surface 35a of the holder 30. The holder 30 receives the biasing force of the coil spring 5 that biases the detent rod 4 upward with the inclined surface 35a. In other words, the holder 30 is also biased in a direction opposite to the direction indicated by arrow c with a biasing force F2. In the present embodiment, the elastic force of the coil spring 34 and the elastic force of the coil spring 5 are set so that the biasing force F2 of the coil spring 5 is greater than the biasing force F1 of the coil spring 34 in the direction indicated by arrow c. In a normal state, a biasing force (F2−F1) biases the holder 30 in the direction opposite to the direction indicated by arrow c. This holds the holder 30 at the position shown in FIGS. 9A and 9B. When the holder 30 is held at this position, the button 40 of the operation unit 2 projects from the lever body 1. In this state, the detent pin 4a is engaged with the guide groove 3c thereby restricting pivoting of the lever body 1.

In the gearshift lever, the biasing force of the coil spring 34 holds the detent rod 4 in contact with the inclined surface 35a of the holder 30 even when the detent rod 4 is moved in the directions indicated by arrows b1 and b2 in accordance with the positions of the steps of the guide grooves 3c with which the detent pin 4a engages. The user must constantly apply the biasing force (F2−F1) when pushing the operation unit 2. Thus, there are not significant changes in the operational responsiveness when the user operates the operation unit 2. This prevents the user from feeling uncomfortable when pushing and operating the operation unit 2.

This gearshift lever operates in the manner described below when the user pushes the button 40 of the operation unit 2 in the direction indicated by arrow c.

Referring to FIG. 10A, the holder 30 moves with respect to the lever body 1 in the direction indicated by arrow c as the extension 22 moves in the slit 33a and the through hole 33b. Referring to FIG. 10B, the detent rod 4 is pushed downward as the distal portion of the detent rod 4 slides along the inclined surface 35a of the holder 30. This moves the detent rod 4 downward. In this manner, when the detent rod 4 is moved downward, the detent pin 4a is disengaged from the guide groove 3c thereby releasing the lever body 1 and allowing the lever body 1 to pivot. Accordingly, the gearshift lever cancels the restriction applied by the detent rod 4 by pushing the operation unit 2 with a simplified structure that eliminates the need for a link member as required in the prior art.

Figure 11:
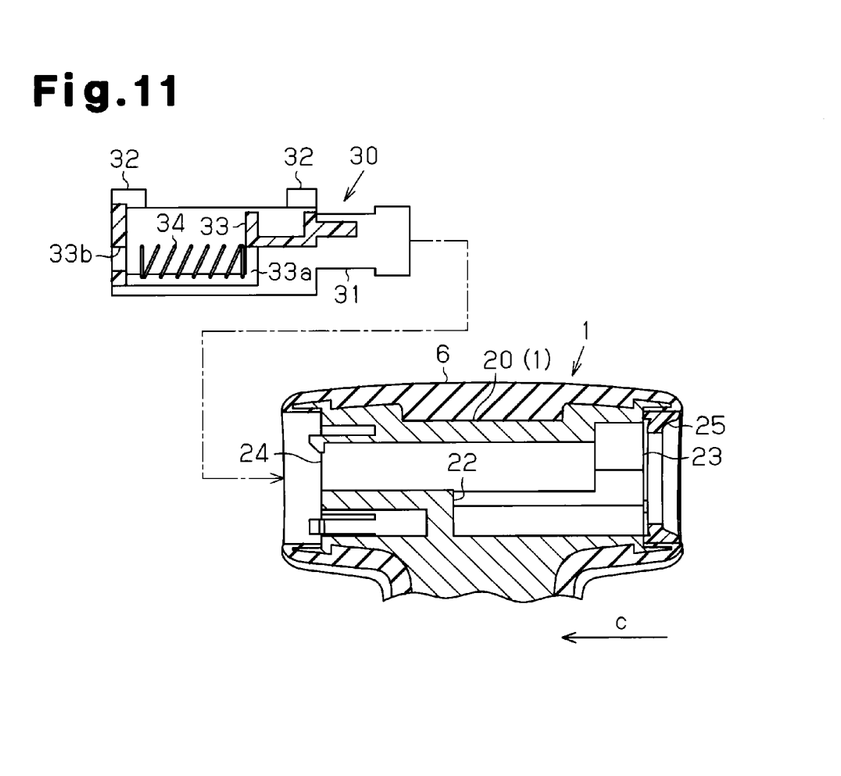
FIG. 11 is a cross-sectional view showing a process for coupling the operation unit to the lever body in the gearshift lever of FIG. 3.
Figure 12:
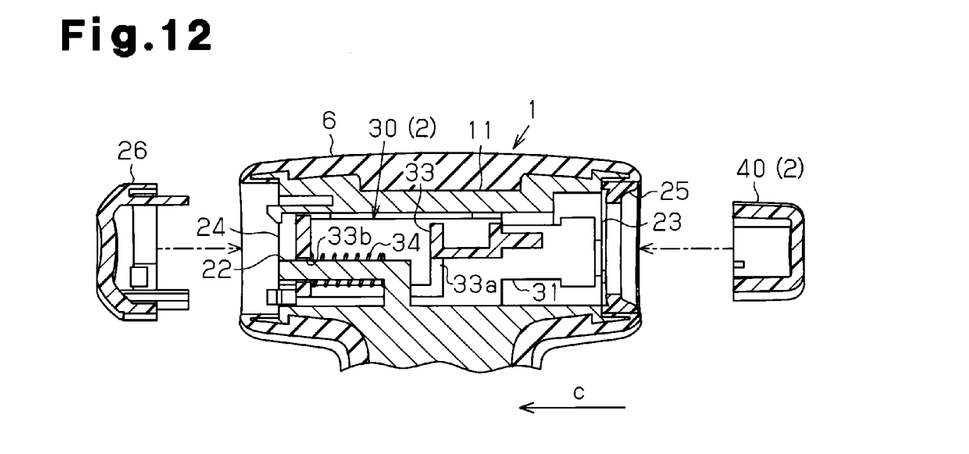
FIG. 12 is a cross-sectional view showing a process for coupling the operation unit to the lever body in the gearshift lever of FIG. 3.

A process for coupling the operation unit 2 to the lever body 1 will now be described with reference to FIGS. 11 and 12. FIGS. 11 and 12 show the process for coupling the operation unit 2 to the lever body 1. Here, the detent rod 4 is not inserted in the bore 11 of the lever body 1.

Referring to FIG. 11, when coupling the operation unit 2 to the lever body 1, the coil spring 34 is first mounted onto the holder 30 by placing the coil spring 34 in the mount 33 of the holder 30. Subsequently, the holder 30 is inserted into the handle 20 through the open end 24 of the handle 20. Then, as shown in FIG. 12, the extension 22 is inserted into the mount 33 through the slit 33a, and the distal portion of the extension 22 is inserted into the coil spring 34 and the through hole 33b. Subsequently, the button 40 is inserted through the open end 23 of the handle 20 and coupled to the fastener 31 of the holder 30. The panel 25 is then coupled to the open end 24 of the handle 20. This completes the coupling of the operation unit 2 to the lever body 1.

This structure allows for the coil spring 34 to be coupled to the lever body 1 just by inserting the holder 30, onto which the coil spring 34 is mounted, into the handle 20. Accordingly, the coil spring 34 is prevented from falling off when the coil spring 34 is coupled to the handle 20. This facilitates the coupling of the coil spring 34 to the handle 20. Thus, the working efficiency is improved when coupling the operation unit 2 to the lever body 1.

The extension 22, which is arranged on the inner wall of the handle 20, may interfere with the coupling of the operation unit 2 to the lever body 1. For example, in a structure in which the holder 30 and the button 40 are integrated to form the operation unit 2, the button 40 and the extension 22 may interfere with each other when inserting the operation unit 2 into the handle 20 from the open end 24. In this respect, the button 40 and the holder 30 of the operation unit 2 in the present embodiment are separate components. Thus, the button 40 and the holder 30 are separately coupled to the lever body 1 when coupling the operation unit 2 to the lever body 1. This facilitates the coupling of the operation unit 2 to the lever body 1 even though the extension 22 is arranged in the handle 20.

The gearshift lever of the first embodiment has the advantages described below.

(1) The operation unit 2 includes the inclined surface 35a, on which the distal portion of the detent rod 4 slides when the operation unit 2 is pushed, and the coil spring 34, which holds the detent rod 4 in contact with the inclined surface 35a. Further, the operation unit 2 includes the mount 33 onto which the coil spring 34 is mounted or positioned. This prevents the user from feeling uncomfortable when the user operates the operation unit 2 with a simplified structure that eliminates the need for a link member as required in the prior art. Further, the working efficiency is improved for coupling the operation unit 2 to the lever body 1.

(2) The mount 33 of the holder 30 is formed to be box-shape and has an open upper surface. Thus, the coil spring 34 can be easily positioned into the holder 30 just by inserting the coil spring 34 through the upper opening of the mount 33. This facilitates the mounting of the coil spring 34 and the assembly of the gearshift lever.

(3) The slit 33a extends through the wall of the mount 33 from the inner side to the outer side of the mount 33. Further, the extension 22, which is inserted into the mount 33 through the slit 33a, is arranged on the inner wall of the handle 20. The coil spring 34 is held in a compressed state between the side wall of the mount 33 and the extension 22. This provides a structure that biases the operation unit 2 with the coil spring 34 in the direction indicated by arrow c in which the operation unit 2 is pushed.

(4) The extension 22 is formed to be L-shaped and includes a portion extending upright from the inner wall surface of the handle 20 and a portion extending in the direction indicated by arrow c. This allows for the coil spring 34 to be arranged on the portion of the extension 22 extending in the direction indicated by arrow c and prevents displacement of the coil spring 34. Thus, the operational responsiveness of the operation unit 2 is properly maintained.

(5) The operation unit 2 is formed by the separate components of the holder 30 and the button 40. Thus, when coupling the operation unit 2 to the lever body 1, the operation unit 2 may be divided into the holder 30 and the button 40. This allows for the operation unit 2 to be easily coupled to the lever body 1 even when the extension 22 is formed on the inner wall of the handle 20.

Second Embodiment

Figure 13:
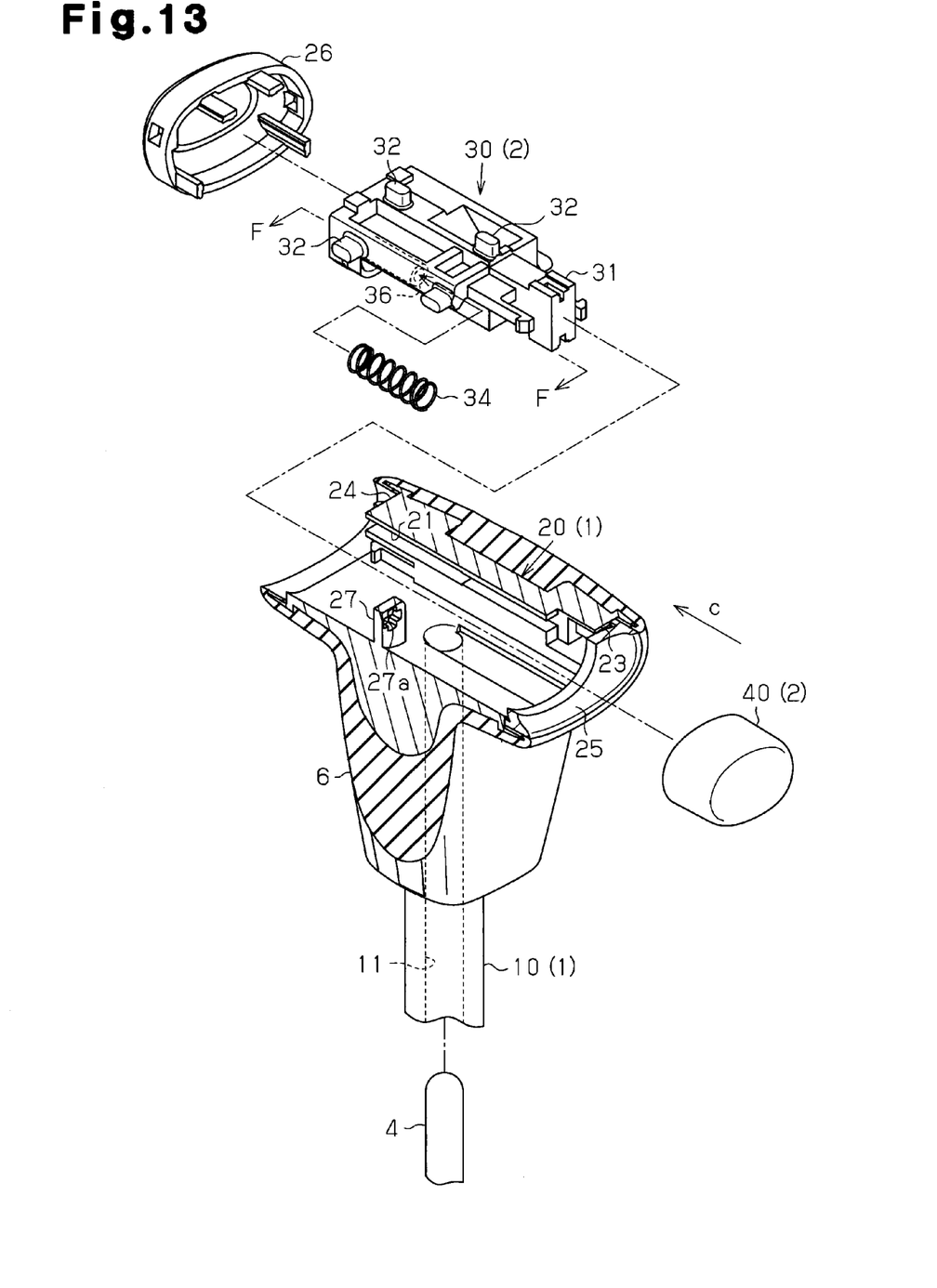
FIG. 13 is an exploded perspective view schematically showing a gearshift lever according to a second embodiment of the present invention.
Figure 14:
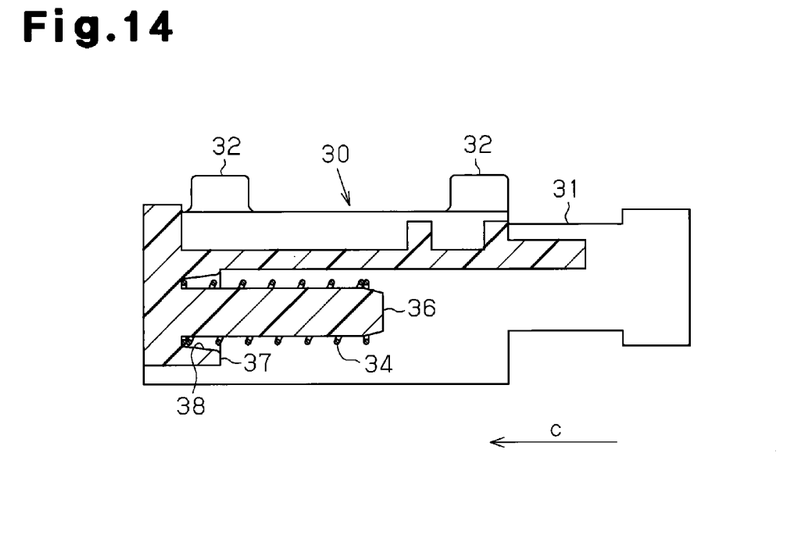
FIG. 14 is a cross-sectional view taken along line F-F in FIG. 13.

A gearshift lever according to a second embodiment of the present invention will now be discussed with reference to FIGS. 13 to 15. The structure of the gearshift lever of the second embodiment is basically the same as the structure shown in FIGS. 3 and 4. FIG. 13 is an exploded perspective view corresponding to FIG. 4 and showing the structure of the gearshift lever of the second embodiment. In FIG. 13, to avoid redundancy, like or same reference numerals are given to those components that are the same as the corresponding components shown in FIG. 4. Such components will not be described. The description hereafter will center on the differences from the first embodiment.

As shown in FIG. 13, the gearshift lever includes an extension 27, which extends upright from the inner lower wall surface of the handle 20. A through hole 27a extends through the extension 27 in the direction indicated by arrow c. FIG. 14 shows the cross-section of the gearshift lever taken along line F-F in FIG. 13. As shown in FIG. 14, the front of the holder 30 includes a flat plane 37, which is orthogonal to the direction indicated by arrow c. A groove 38 is formed in the flat plane 37. The groove 38 is recessed in the direction indicated by arrow c. A mount 36, which is rod-shaped and extends in a direction opposite to the direction indicated by arrow c, extends from the bottom surface of the groove 38. A coil spring 34 is arranged on the mount 36. Although not shown in FIG. 14, the holder 30 also includes a recess 35 and an inclined surface 35a in the same manner as the holder 30 of the first embodiment.

The coil spring 34 is mounted onto the holder 30 just by fitting the coil spring 34 to the mount 33. This structure facilitates the mounting of the coil spring 34 and the assembly of the shift lever.

The structure of the gearshift lever according to the second embodiment will now be described with reference to FIG. 15. FIG. 15, which corresponds to FIG. 9A, shows the cross-section of the gearshift lever.

Figure 15:
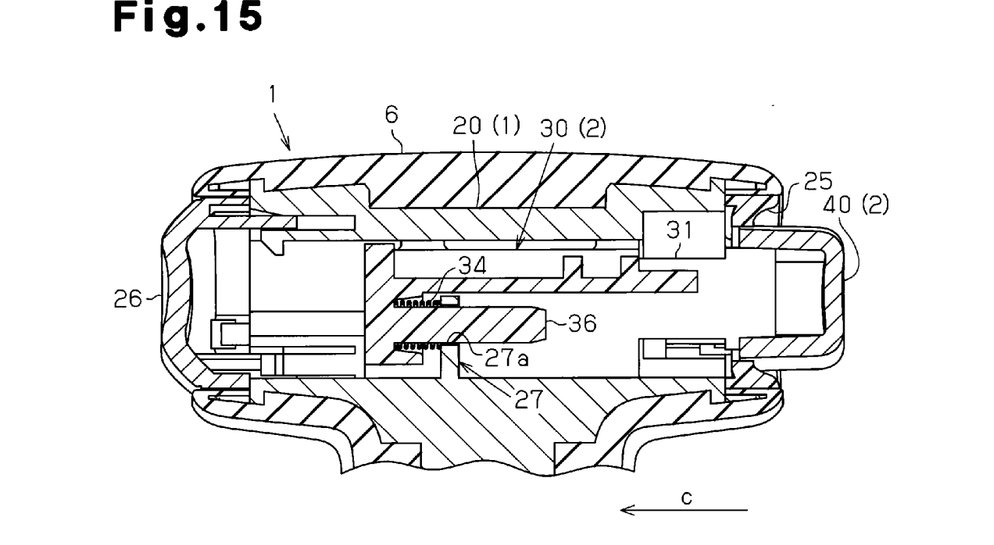
FIG. 15 is a cross-sectional view schematically the gearshift lever of FIG. 13.

As shown in FIG. 15, the mount 36 of the holder 30 is inserted through the insertion hole 27a of the extension 27, which is arranged on the handle 20. The coil spring 34 is held and compressed between the bottom surface of the groove 38 in the holder 30 and the extension 27 to bias the holder 30 in the direction indicated by arrow c. This holds the detent rod 4 in contact with the inclined surface 35a of the holder 30. This prevents the user from feeling uncomfortable when the user operates the operation unit 2 in the same manner as the gearshift lever of the first embodiment.

The gearshift lever of the second embodiment has advantages that are the same or similar to advantages (1) and (5). The gearshift lever of the second embodiment also has the advantages described below instead of advantages (2) to (4) of the gearshift lever of the first embodiment.

(6) The mount 36 of the holder 30 is formed to be rod-shaped. In this case, the coil spring 34 is mounted or positioned onto the holder 30 just by arranging the coil spring 34 on the mount 36. This facilitates the mounting of the coil spring 34 and improves convenience when assembling the gearshift lever. Further, displacement of the coil spring 34 is prevented, and the operational responsiveness of the operation unit 2 is properly maintained.

(7) The extension 27 for insertion of the mount 36 is arranged on the inner wall of the handle 20. Further, the coil spring 34 is held and compressed between the extension 27 and the surface of the holder 30 from which the mount 36 extends. This easily forms a structure for biasing the operation unit 2 with the coil spring 34 in the direction indicated by arrow c in which the operation unit 2 is pushed.

(8) The groove 38 is formed on the surface of the holder 30 from which the mount 36 extends. The mount 36 extends from the bottom surface of the groove 38. In this structure, one end of the coil spring 34 is inserted into the groove 38 when fitting the coil spring 34 to the mount 36. This prevents displacement of the coil spring 34 in a more reliable manner. Thus, the operational responsiveness of the operation unit 2 is improved.

It should be apparent to those skilled in the art that the present invention may be embodied in many other specific forms without departing from the spirit or scope of the invention. Particularly, it should be understood that the present invention may be embodied in the following forms.

The extension 22 is L-shaped in the first embodiment. Instead, the extension 22 may be formed by just the portion extending upright from the inner wall surface of the handle 20.

The mount 33 includes an upper opening in the first embodiment. Instead, the mount 33 may include an open side surface.

The groove 38 is formed in the portion of the holder 30 from which the mount 36 extends in the second embodiment. However, the groove 38 may be eliminated.

In each of the above embodiments, the operation unit 2 is formed by the separate components of the holder 30 and the button 40. Instead, the holder 30 and the button 40 may be formed integrally as long as interference does not occur between the button 40 and the extensions 22 and 27 when the button 40 is inserted through the open end 24. For example, the button 40 may be reduced in size or the layout of the extensions 22 and 27 may be changed.

In each of the above embodiments, the extensions 22 and 27 are formed on the lower part of the inner wall surface of the handle 20. Instead, the extensions 22 and 27 may be formed on the inner upper wall surface or inner side wall surface of the handle 20.

The present examples and embodiments are to be considered as illustrative and not restrictive, and the invention is not to be limited to the details given herein, but may be modified within the scope and equivalence of the appended claims.

What is claimed is:

1. A gearshift lever for changing a gear range of a vehicle transmission, wherein the gearshift lever is pivotally supported by a base plate, the gearshift lever comprising:
   a lever body;
   an extension fixed to the lever body;
   a detent rod accommodated in the lever body, wherein the detent rod engages a detent receptacle arranged in the base plate to restrict pivoting of the lever body; and
   an operation unit arranged on the lever body, wherein the operation unit is pushed and operated to disengage the detent rod from the detent receptacle and cancel restriction of the pivoting of the lever body, wherein the operation unit includes:
      an inclined surface, on which the detent rod slides, wherein the inclined surface moves the detent rod in a direction in which the detent rod disengages from the detent receptacle when the operation unit is pushed;
      a coil spring that biases the operation unit in a direction, which is the same as a direction in which the operation unit is pushed, to hold the detent rod in contact with the inclined surface, the coil spring arranged circumferentially about the extension; and
      a mount defined by a cavity in the operation unit so that the mount positions the coil spring, the mount slidably movable relative to the extension.

2. The gearshift lever according to claim 1, wherein the mount is box-shaped and includes an open wall surface.

3. The gearshift lever according to claim 2, wherein:
   the mount includes a wall through which a slit extends from an inner side to an outer side of the mount;
   the lever body includes an inner wall on which an extension is arranged, the extension being inserted into the mount through the slit; and
   the coil spring is held and compressed between the extension and the wall of the mount.

4. The gearshift lever according to claim 1, wherein the mount is rod-shaped.

5. The gearshift lever according to claim 4, wherein:
   the lever body includes an inner wall on which the extension is arranged, the mount being insertable into the extension; and
   the coil spring is held and compressed between the extension and a surface of the operation unit from which the mount extends.

6. The gearshift lever according to claim 3, wherein the extension is L-shaped and includes a portion that extends upright from the inner will of the lever body and a portion that extends in the direction in which the operation unit is pushed.

7. The gearshift lever according to claim 5, further comprising a groove arranged in the surface of the operation unit from which the mount extends, wherein the mount extends from a bottom surface of the groove.

8. The gearshift lever according to claim 1, wherein the operation unit includes a button, pushed and operated by a user, and a holder, coupled integrally with the button and including the inclined surface and the mount, the button and the holder being separate components.

9. The gearshift lever according to claim 1, wherein:
   the inclined surface and the mount are formed by the same member; and
   the inclined surface and the mount move linearly in the same direction when the operation unit is pushed.

10. The gearshift lever according to claim 1, wherein the coil spring biases the operation unit with a first biasing force, and the gearshift lever further comprises: a second coil spring that biases the detent rod toward the inclined surface with a second biasing force that is greater than the first biasing force in a direction opposite to the direction in which the operation unit is pushed; wherein a force operative to push and operate the operation unit is defined by the first biasing force subtracted from the second biasing force.

* * * * *